United States Patent [19]

Chen et al.

[11] Patent Number: 5,778,100
[45] Date of Patent: Jul. 7, 1998

[54] METHOD AND APPARATUS FOR REDUCING THE BIT RATE IN A VIDEO OBJECT PLANES SEQUENCE CODER

[75] Inventors: Homer H. Chen, Thousand Oaks, Calif.; Barin G. Haskell, Tinton Falls; Joern Ostermann, Red Bank, both of N.J.

[73] Assignee: Lucent Technologies Inc., Murray Hill, N.J.

[21] Appl. No.: 613,963

[22] Filed: Mar. 8, 1996

[51] Int. Cl.$^6$ .................. G06K 9/36; H04N 7/12; H04N 5/14
[52] U.S. Cl. .................. 382/243; 348/416; 348/700; 382/236
[58] Field of Search .................. 382/241–243, 382/199, 236; 348/416, 700, 405, 384, 402, 413, 699

[56] References Cited

U.S. PATENT DOCUMENTS

| | | | |
|---|---|---|---|
| 3,632,865 | 1/1972 | Haskell et al. | 348/416 |
| 4,951,140 | 8/1990 | Ueno et al. | 348/413 |
| 5,274,453 | 12/1993 | Maeda | 348/700 |
| 5,295,201 | 3/1994 | Yokohama | 382/236 |
| 5,420,638 | 5/1995 | Riglet al. | 348/700 |
| 5,592,228 | 1/1997 | Dachiku et al. | 382/241 |
| 5,642,166 | 6/1997 | Shin et al. | 348/416 |

Primary Examiner—David K. Moore
Assistant Examiner—Wenpeng Chen

[57] ABSTRACT

A method and apparatus for reducing the output bit rate in a video object planes sequence encoder. An approximation of the shape of an object on a current frame is generated and used, along with a predicted image of the object from a subsequent frame and an estimate of the displacement of the object, to predict an image of the object in a current frame. A stripe is formed around the predicted image and the picture elements contained in the stripe are assigned texture values. The predicted image and stripe are subtracted from the current frame to form an error signal which is masked by the approximate shape of the object and provided to an entropy coder for transmission at an output bit rate.

28 Claims, 2 Drawing Sheets

METHOD AND APPARATUS FOR REDUCING THE BIT RATE IN A VIDEO OBJECT PLANES SEQUENCE CODER

BACKGROUND OF THE INVENTION

I. Field of the Invention

This invention broadly relates to an encoder for the coding of video information and a corresponding decoder. In particular, the invention provides a block-based sequence encoder and decoder having improved object image prediction for compensating motion of an object depicted in a frame of a video signal. Most particularly, the present invention is directed to a method and apparatus for improving the temporal prediction of objects by a block-based encoder for reducing the encoder output bit rate.

II. Description of Background Art

Video encoders are used for coding video information in the form of video frames into a continuous stream of bits for transmission to a receiver having a corresponding decoder. The decoder translates the digital encoded signal back to video information which is then displayed, for example, on a video screen or CRT. Video information is typically comprised of video frames wherein images of objects contained therein are represented by picture elements (pels) having color components and wherein motion of the objects is represented by displacement or motion vectors.

The amount of transmitted coded video information is limited by the bandwidth of the system in which the encoders operate. Thus, most if not all existing encoders employ various techniques for efficient use of the limited available bandwidth. One such technique utilizes an error signal corresponding to the difference between a current video frame and a quantized version of a prior frame. The error signal is digitized and then quantized by a quantizer operating at a particular step size for reducing the amount of transmitted bits required for accurate video signal representation. The quantized error signal is transmitted to a decoder for adjusting the present display on the video screen. This technique is preferred because a video information signal consists of a continuous stream or series of frames. Thus, to depict an image represented in a current frame on a screen that is displaying an existing image, data representing the entire current frame need not be transmitted but, rather, only the differences or variations (in the form of the error signal) between the displayed frame and the current frame are transmitted and the existing image is then altered accordingly to display the current frame image.

FIG. 1 depicts a prior art encoder of the type described hereinabove for coding video information. Such an encoder can be employed with direct television systems or CD ROM systems as well as with video phone technology wherein, for example, video information is transmitted over an Integrated Services Digital Network (ISDN) line. As shown in FIG. 1, the encoder 10 receives at any given time a portion of a video signal comprised of a series of successive-in-time video frames input from a camera 12. Each frame is digitized by an analog-to-digital (A/D) converter 14 and then divided into macro blocks of 16×16 picture elements (pels) by a block splitter 18 that supplies the encoder 10 with one macro block of video information at any given time.

An error signal representing the difference between the current macro block and an estimate of the current macro block is generated by a subtractor 20. The estimate consists of a prediction of the image of the current block, i.e. color or texture, derived from a predictor 42 as well as a displacement measurement of the image. The displacement measurement is typically in the form of a motion vector generated by a displacement estimator 44 which measures a displacement between images by comparing the current block to a corresponding previous block that was stored in a frame store or memory 36. The resulting error signal is converted from the spatial domain to the frequency domain by a discrete cosine transform (DCT) unit 22 whereupon the frequency components of the error signal are quantized by a quantizer unit 24 operating at a preselected step size. The quantized error signal is split at node 26 and supplied to an entropy coder 28 that also receives the corresponding displacement vector from the displacement estimator unit 44. The output of entropy coder 28 is then input to a buffer 30 which regulates the bit rate provided to a transmitter (not shown) for transmitting the coded video information error signal and motion vector to an external or remote decoder.

The error signal from node 26 is also fed to an inverse discrete cosine transform (IDCT) unit 32 and is then added to the current predicted image at adder 34. The resulting signal is provided to the frame store 36 for use by predictor 42 and displacement estimator 44 in predicting an image for a corresponding block for a subsequent frame. Also as shown in FIG. 1, buffer 30 includes a control means 31 for adjusting the step size of the quantizer 24 in response to an overflow of the buffer, whereupon the quantizer step size is increased to reduce the quantity of bits generated.

In general, video encoders basically determine, for each macro block of a frame containing an object, whether displacement vectors (representative of object motion) and DCR coefficients (representative of object texture or color) of an error signal need to be transmitted. In other words, an encoder determines whether an existing image on a screen needs to be altered or changed, and by how much, to depict a current image. This is accomplished by identifying significant changes between the previous image and the current image as well as determining whether the previous image displayed on a screen is a satisfactory representation of the corresponding image input to the encoder by camera 12.

If instead of encoding an entire frame, only a portion of a frame is to be encoded, such as a portion containing one or more objects, each object is distinguished and coded separately from the other(s) by utilizing known segmentation and shape approximation techniques. The efficiency at which an object can be coded depends on the accuracy of image prediction generated by the predictor 42. In the context of a moving object, the silhouette of the object will, in all likelihood, change in the image plane across adjacent-in-time frames. Thus, the size of the predicted object generated by predictor 42 may, in some circumstances, be smaller than the current size of the object as depicted in the current frame input to the encoder. This creates significant errors in an encoder at the output of subtractor 20 because the predictor 42 utilizes the pel values of the object image from the previous frame and the shape approximation of the object from the current frame to assign pel values to an estimate of a current image. Thus, when the silhouette of the object in the current frame is different than in the previous frame, the pels of the current frame do not match up or correspond with the pels of the estimate of the current frame as output by predictor 42. When this occurs, some current pels do not have corresponding counterpart pels from the prediction. Thus, significant errors result which yield an increase in the amount of bits required for transmission by the encoder to adequately represent the current object on a video screen.

SUMMARY OF THE INVENTION

Accordingly, an encoding method is desired which compensates for changes in object configuration among successive video frames to reduce the encoder output bit rate by improving the temporal petition of the coded object.

The present invention accomplishes this goal by providing a method for reducing the bit rate in a video object planes sequence encoder through analysis and coding of an object image having texture and position components and represented by a video signal defined by a continuous stream of successive-in-time video frames having a plurality of picture elements. The inventive method approximates a shape of the object as it appears on a current frame, estimates the displacement of the object based on the object position in a prior frame and the object position in the current frame, and predicts an image containing picture elements for the object. The image prediction is based on an image of the object present on the prior frame, the current shape approximation and the current object displacement. An outline stripe having a width and containing picture elements is then generated which encompasses the predicted image so that the size of the predicted image and the stripe are at least equal in size to the size of the approximate current shape. The picture elements contained in the stripe are assigned texture values based on the picture element values in the predicted image. The outline stripe and predicted image are then subtracted from the current frame to form an error signal which is masked with the approximate shape to pass to an entropy coder substantially all picture elements that are active in both the error signal and the approximate shape.

The present invention is also directed to a video object planes sequence encoder having a reduced bit rate which analyzes and codes an object image having texture and position components and represented by a video signal defined by a continuous stream of successive-in-time video frames having a plurality of picture elements. The inventive encoder includes a shape approximator for approximating a shape of the object as it appears on a current frame and a displacement estimator for estimating the displacement of the object based on the object position in a prior frame and the object position in the current frame. An image predictor is connected to the shape approximator and to the displacement estimator for predicting an image for the object. The prediction is based on an image of the object present on the prior frame, the shape approximation and the object displacement estimate.

An outline generator is also provided for generating an outline stripe having a width and boundingly containing picture elements. The stripe encompasses the predicted image so that the size of the predicted image and the stripe is at least equal in size to the size of the approximate shape of the object on the current frame. An assigning unit is also provided for assigning texture values to the picture elements in the stripe based on picture element values in the approximate shape. A subtractor subtracts the outline stripe and predicted image from the current frame to form an error signal. The error signal is then masked with the approximate shape by a mask unit connected to the subtractor wherein substantially all picture elements that are active in both the error signal and the approximate shape are passed to a quantizer in communication with the mask unit. The quantizer quantizes the masked error signal and provides the quantized signal to an entropy coder for coding the quantized masked error signal for transmission.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DECRIPTION OF THE DRAWINGS

In the drawings, wherein like reference numerals denote similar elements throughout the several views.

DETAILED DESCRIPTION OF THE PREFERRED EMBODIMENT

Figure 2:
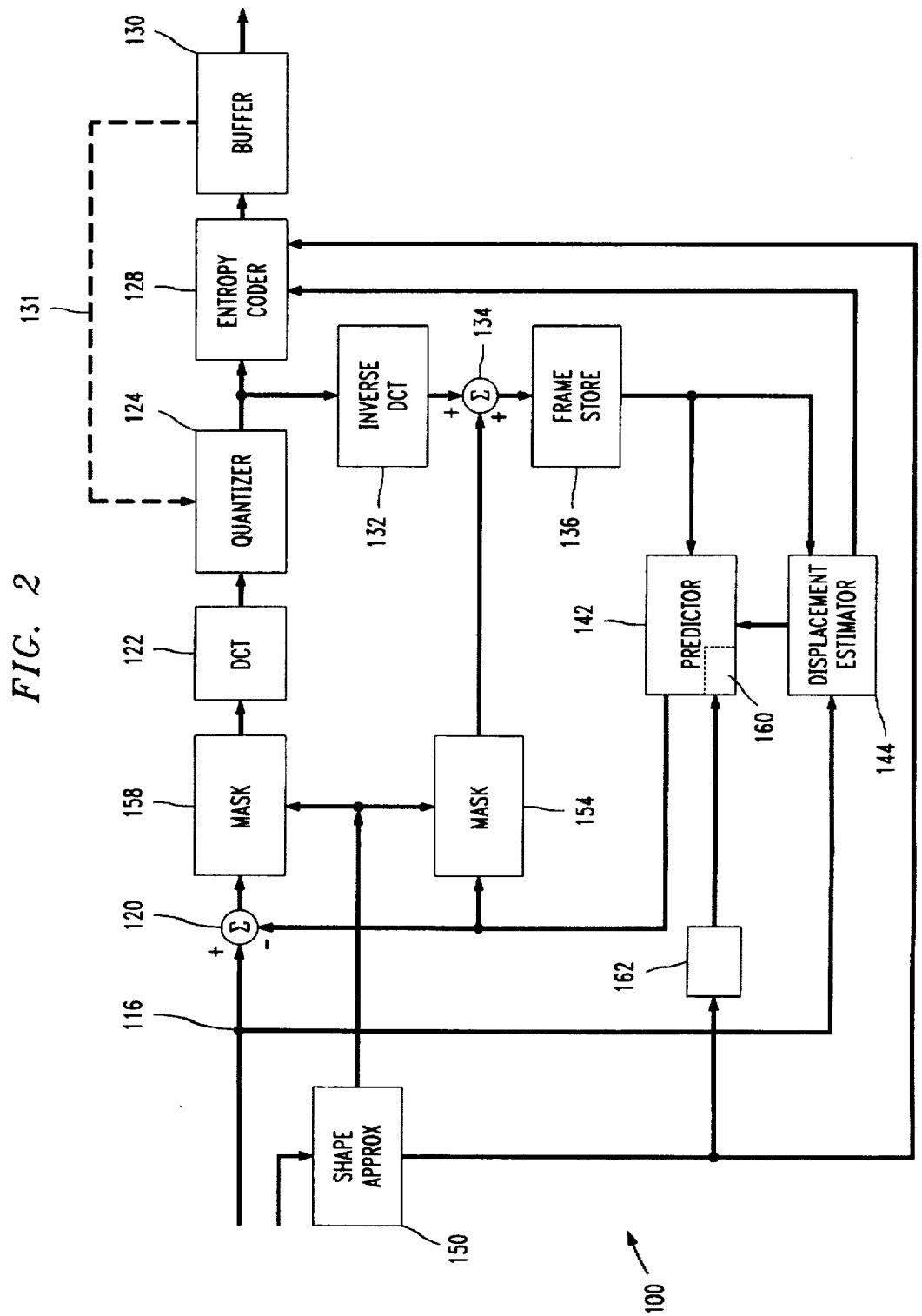
FIG. 2 is a block diagram of an encoder constructed in accordance with a preferred embodiment of the present invention.

With specific reference now to FIG. 2, a block diagram of a video encoder 100 constructed in accordance with the present invention and particularly suited for coding multiple objects in a scene is depicted. The encoder 100 is a block-based encoder and, as such, codes one macro block of a video signal frame at any given time. Video encoder 100 has similar components to those of the prior art encoder 10 with the primary exception of an added shape approximation unit 150 for identifying and distinguishing plural objects in a scene, and first and second masking units 154, 158. These additional components, used in conjunction with an image expansion technique more fully described below, operate to advantageously reduce the bit rate of the encoder 100 by limiting the error signal provided to the entropy coder 128 and buffer 130 for transmission to a receiver and corresponding decoder.

Figure 1:
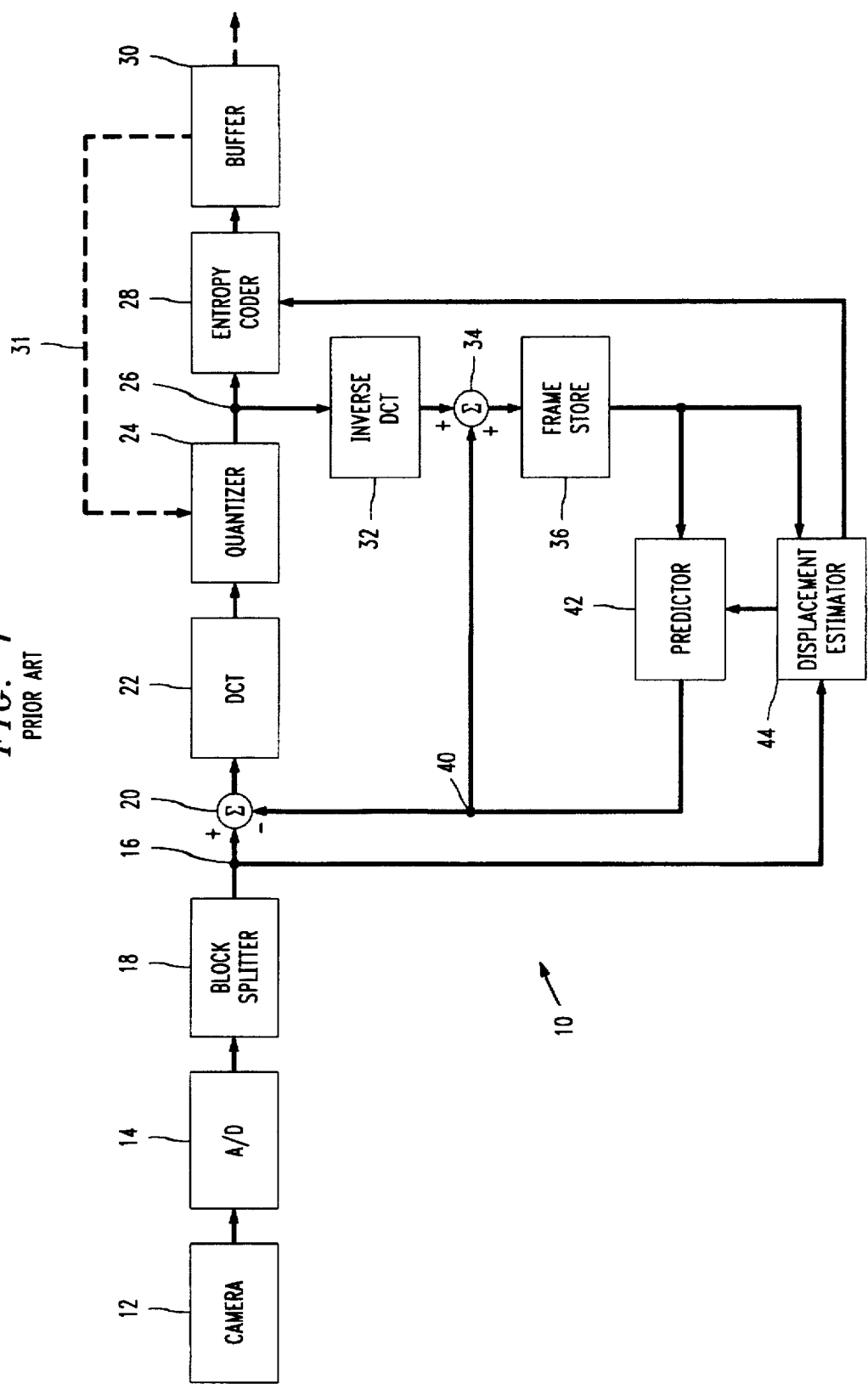
FIG. 1 is block diagram of a prior art encoder.

As is well known to those having ordinary skill in the art, shape approximation unit 150 estimates or approximates the shape or contour of a particular object contained in a scene and represented in a video frame. The approximation is typically performed utilizing well-known segmentation techniques wherein the object is divided into portions or segments for facilitating silhouette detection. As shown in FIG. 2, the output of shape approximation unit 150 is connected to and interfaces with predictor 142 which also receives one or more motion vectors representing motion for the object of interest. The motion vectors are generated by the displacement estimator 144, which compares the location of the object in the current frame with its location in the previous frame. In addition, and as described above with respect to FIG. 1, the predictor 142 also receives as an input the preceding or previous frame from the frame store unit 136. Utilizing these three inputs, i.e. the shape approximation of the object from the current frame, the motion displacement vectors, and the previous frame, the predictor 142 generates a prediction of the object image for the current frame.

As explained above, when the shape of an object changes over successive-in-time frames, some of the pels of the predicted image generated by predictor 142—which partially bases the prediction on the previous frame obtained from the frame store 136—do not have corresponding pels from the object image in the current frame. Such an occurrence generates an error signal at subtractor 120. The error is particularly significant when the object shape is larger in the current image than in the prediction thereof. In accordance with the present invention, and to remove or limit the effects of such an error signal, the predictor 142 enlarges or expands the predicted image to a size at least equal to the size of the object shape contained in the current frame. This is accomplished by generating or creating a border or stripe, having a specified width n, encompassing the predicted image so that the combination of the predicted image and the stripe is greater than or equal in size to the size of the object as it appears in the current frame. The stripe is generated by an outline unit 160 preferably comprising part of the predictor 142. The pels contained within the stripe width n are assigned texture values, i.e. color, according to any one of a variety of techniques, some of which are discussed by way of example hereinbelow. As will be appreciated, by enlarging or expanding the predicted image in this manner to a size equal to or greater than that of the current actual image, pels are now present in the predicted image which correspond with the pels in the current actual image.

The resulting predicted image together with the added border or stripe is output by the predictor 142 and provided to both the subtractor 120, for generation of an error signal, and a prediction masking unit 154 positioned within a prediction feedback loop. In addition to the predicted image and stripe, the prediction masking unit 154 also receives the shape estimate of the object present in the current frame, i.e. the frame currently processed by the encoder 100. The masking unit 154 is essentially a multiplication unit which masks the approximated shape of the current object with the output of the predictor 142. Only the pels that are active in both the estimated shape and the predicted image and stripe are output by the masking unit 154. By this technique, the predicted image as enlarged by the added stripe is reduced in size or tailored to more closely match the shape of the object as it appears in the current frame. The output of masking unit 154 is provided to adder 134 for addition, in a manner described more fully above with respect to the prior art encoder 10 of FIG. 1, to the quantized spatial domain version of the error signal for storage in frame store 136. The stored signal is used by the predictor 142 for prediction of the object as it appears in the next-in-time video frame.

The resulting predicted image as enlarged by the predictor 142 is also provided to the subtractor 120 for deduction from the incoming current video frame, e.g. the macro block portion of the current frame, which is provided to encoder 100 at node 116. The resulting error signal is input to a second masking unit 158 together with the estimated shape of the current object as generated by the shape approximation unit 150. Masking unit 158 operates in a manner similar to that of prediction masking unit 154 in that it will pass to a discrete cosine transform (DCT) unit 122 only these pels active in both the estimated shape and the resulting error signal. The DCT unit 122, like the DCT unit 22 discussed above with respect to FIG. 1, converts the resulting error signal from the spatial domain to the frequency domain whereupon the frequency signal is quantized by quantizer 124 and provided to the entropy coder 128 for coding in a manner well known to those having ordinary skill in the art. The coded signal is then output to buffer 130 which is interfaced with a transmitter (not shown) for transmitting the signal to a receiver for decoding and further processing. The quantized signal is also provided to an inverse DCT unit 132 which converts the quantized signal back into the spatial domain whereupon it is added to the predicted masked image of the previous-in-time frame as generated by predictor 142 and prediction masking unit 154. As stated above, the resulting signal is stored in frame store unit 136 for use in processing the next video frame.

To limit the processing time of the encoder 100, the width n of the stripe is selected to limit the amount of excessive pels, i.e. pels which are present in the stripe but which do not correspond with pels in the shape or approximation of the object contained in the current frame as generated by the shape approximating unit 150. Stripe width n may for example be a constant value of pels equal in number to the largest distance between corresponding pel pairs, with each pel pair containing a pel defined in the stripe and a corresponding pel from the approximated current object shape. Thus, once the maximum point-to-point distance is calculated, a stripe having a specified number of picture elements contained within the maximum distance, i.e. a constant width stripe, is generated encompassing the predicted image. As an alternative, the stripe width n may be a function of the object shape as generated by the shape approximating unit 150. Thus, a stripe having a varying width may be generated and employed in accordance with some contemplated implementations of the invention.

As will be appreciated, although the computation of a stripe having a variable width dependent on the object shape estimation reduces the amount of pels contained in the resulting stripe, thereby reducing the amount of excessive pels which must be masked by masking unit 154, such a computation increases the processing time of the encoder 100. On the other hand, a stripe having a constant width n will contain more extraneous pels than that of a stripe having a tailored or varying width. Thus, although such a stripe can be generated with less computation time, more pels are present for masking by masking unit 154. In the preferred embodiment, a threshold value for the stripe width n is selected based upon encoding processing requirements to limit the amount of processing time required by the encoder 100. Regardless of the width of the generated stripe, the pels contained therein must be assigned a texture or color value corresponding to the texture values of pels in the predicted image.

Not all deviations in the object location and object shape between a previous frame and a current frame will result in an error signal. For example, where the object silhouette is smaller in a current frame than in the immediately preceding frame, no error may result. Nevertheless, information pertaining to the reduction in shape size must still be transmitted to a decoder, along with the new position of the object. Accordingly, the output of the shape approximating unit 150 is provided, along with the output of displacement estimator 144, directly to the entropy coder 128 for transmission to a decoder.

In addition, the value of stripe width n need not be transmitted by the encoder 100 to a decoder. This is because the decoder can calculate the width n independently. The decoder knows the shape of the predicted object because the object is either already displayed on a screen or the data has already been received by the decoder. The decoder is also aware of the size and position of the object in the current frame due to the transmitted shape approximation and transmitted displacement vector. Hence, the width can be derived at the decoder from the difference between these two shapes, and no additional bits are therefore required to communicate the dimensions of stripe width n to the decoder.

As stated above, when the predicted image is enlarged in accordance with the present invention, the pels contained within the included stripe must be assigned appropriate color values. One technique for accomplishing this is pel repetition wherein each pel in the stripe is set to an equivalent value of the closest pel inside the predicted image. As an alternative to pel repetition, values for the pels contained in the stripe may be assigned by utilizing texture extrapolation techniques such as Projection Onto Convex Set (POCS). Although POCS requires additional computation time, prediction results are improved over pel repetition techniques, especially for a periodically textured object.

The object shape approximation is performed by the shape approximation unit 150 utilizing, in a preferred form of the invention, segmentation techniques. Due to segmentation errors, the shape estimate generated by the shape approximation unit, which is used by the predictor 142 to generate the predicted image and stripe, may contain portions of the background resulting in additional error for the coded video signal. To compensate for any such background that is included within the object shape approximation, the preferred embodiment implements an erosion technique performed by an eroding unit 162, connected between the shape approximator 150 and the predictor 142, which erodes the approximated shape with a structuring element of a designated size such, for example, as a micro block of 3×3 or 5×5 pels.

As already described, the encoder 100 uses displacement vectors to estimate motion of an object among successive-in-time video frames. Such motion estimation and is generated by the displacement estimator 144 and is provided to the predictor 142 for use in predicting images. Any of several techniques may be employed to effect motion compensation, such as block motion compensation (BMC) which uses a single motion assigned to a subject macro block to predict the image of that macro block. A drawback to BMC is that in the event an object extends partially into a particular block such that only a portion of that block represents the object whereas the remainder of the block represents the background, the predicted image of the entire block will be derived using only a single motion vector.

As an alternative to BMC, therefore, overlapped block motion compensation (OBMC) is preferred. This technique is used on a block basis and does not require any information regarding the particular object's shape whose motion is being calculated or estimated. OBMC divides each macro block into portions wherein the image of each portion is predicted based on the current motion vectors for the subject block, the motion vectors of the adjacent macro blocks and the previous coded images for the subject block and the adjacent blocks. If, however, OBMC is used in conjunction with the shape approximation information, a determination can be made as to when the motion vectors of the adjacent blocks should not be used.

Thus, and as should by now be appreciated, the inventive encoder 100 reduces the errors generated when the object silhouette is larger in a current frame than in a previous-in-time frame. Accordingly, the bit error rate can be reduced.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method for reducing an output bit rate in a video object planes sequence encoder which analyzes and codes an object image having texture and position components and represented by a video signal defined by a continuous stream of successive-in-time video frames having a plurality of picture elements, said method comprising the steps of:

approximating a shape of an object as it appears on a current frame, to define an approximate shape having a boundary and a size;

estimating frame-to-frame displacements of the object based on object position in a prior frame and the object position in the current frame;

predicting an image for the object in the current frame based on an image of the object on said prior frame, said approximate shape and said estimated object displacements;

generating an outline stripe having a width and containing picture elements, said stripe encompassing said predicted image so that the size of said predicted image and said stripe is at least equal in size to the size of said approximate shape;

assigning texture values to the picture elements in said stripe, said values being based on picture element values in said predicted image;

subtracting said outline stripe and said predicted image from the current frame to form an error signal; and masking said error signal with said approximate shape to pass to an entropy coder substantially all picture elements that are active in both said error signal and said approximate shape.

2. The method of claim 1, wherein the width of said outline stripe has a maximum value corresponding to a maximum distance between the picture elements on a boundary of the predicted image and corresponding picture elements contained on the boundary of said approximate shape.

3. The method of claim 2, wherein the width of said outline strip is a constant value.

4. The method of claim 2, wherein the width of said outline stripe varies based on the boundary and size of said approximate shape of the object in the current frame and the prior frame and the displacements of the object.

5. The method of claim 3, wherein the width value is below a threshold width value.

6. The method of claim 4, wherein the maximum width value is below a threshold width value.

7. The method of claim 1, wherein said assigning step is performed using picture element repetition techniques.

8. The method of claim 3, wherein said assigning step is performed using picture element repetition techniques.

9. The method of claim 4, wherein said assigning step is performed using picture element repetition techniques.

10. The method of claim 1, wherein said assigning step is performed utilizing texture extrapolation techniques.

11. The method of claim 3, wherein said assigning step is performed utilizing texture extrapolation techniques.

12. The method of claim 4, wherein said assigning step is performed utilizing texture extrapolation techniques.

13. The method of claim 1, further comprising the step of dividing each video frame into macro blocks, and wherein said predicting step further comprises utilizing block motion compensation techniques for predicting, for a particular block containing at least a portion of the image in the current frame, texture of the image portion in the particular block based on (1) displacement of the image-portion containing macro block from the previous frame to the current frame, (2) the predicted image of the image-portion containing macro block from the previous frame and (3) the masked error signal for the image-portion containing macro block of the prior frame.

14. The method of claim 9, further comprising the step of dividing each video frame into macro blocks, and wherein said predicting step further comprises utilizing block motion compensation techniques for predicting, for a particular block containing at least a portion of the image in the current frame, texture of the image portion in the particular block based on (1) displacement of the image-portion containing macro block from the previous frame to the current frame, (2) the predicted image of the image-portion containing macro block from the previous frame and (3) the masked error signal for the image-portion containing macro block of the prior frame.

15. The method of claim 10, further comprising the step of dividing each video frame into macro blocks, and wherein said predicting step further comprises utilizing block motion compensation techniques for predicting, for a particular block containing at least a portion of the image in the current frame, texture of the image portion in the particular block based on (1) displacement of the image-portion containing macro block from the previous frame to the current frame, (2) the predicted image of the image-portion containing macro block from the previous frame and (3) the masked error signal for the image-portion containing macro block of the prior frame.

16. The method of claim 1, further comprising the step of dividing each video frame into a plurality of macro blocks, and wherein said predicting step further comprises utilizing overlapped block motion compensation techniques for predicting, for a particular block containing at least a portion of the object image in the current frame, texture of the object image portion in the particular block.

17. The method of claim 1, further comprising the step of dividing each video frame into a plurality of macro blocks, and wherein said predicting step further comprises utilizing overlapped block motion compensation techniques for predicting, for a particular block containing at least a portion of the object image in the current frame, texture of the object image portion in the particular block based on (1) displacement of the image-portion containing macro block from the previous frame to the current frame, (2) the predicted image of the image-portion containing macro block from the previous frame, (3) predicted images of portions of macro blocks in the previous frame which are adjacent the image-portion containing macro block of the previous frame, (4) the masked error signal for the image-portion containing macro block of the prior frame, (5) the masked error signals of macro blocks adjacent the image-portion containing macro block of the previous frame, and (6) the estimated displacements of said adjacent blocks of the current frame.

18. The method of claim 17, wherein the portions of macro blocks in the previous frame which are adjacent the image portion containing macro block of the previous frame, contain sections of the object image.

19. The method of claim 10, further comprising the step of dividing each video frame into a plurality of macro blocks, and wherein said predicting step further comprises utilizing overlapped block motion compensation techniques for predicting, for a particular block containing at least a portion of the image in the current frame, texture of the image portion in the particular block.

20. The method of claim 10, further comprising the step of dividing each video frame into a plurality of macro blocks, and wherein said predicting step further comprises utilizing overlapped block motion compensation techniques for predicting, for a particular block containing at least a portion of the image in the current frame, texture of the image portion in the particular block based on (1) displacement of the image-portion containing macro block from the previous frame to the current frame, (2) the predicted image of the image-portion containing macro block from the previous frame, (3) predicted images of portions of macro blocks in the previous frame which are adjacent the image-portion containing macro block of the previous frame, (4) the masked error signal for the image-portion containing macro block of the prior frame, (5) the masked error signals of macro blocks adjacent the image-portion containing macro block of the previous frame, and (6) the estimated displacements of said adjacent blocks of the current frame.

21. The method of claim 20, wherein the portions of macro blocks in the previous frame which are adjacent the image portion containing macro block of the previous frame, contain sections of the object image.

22. The method of claim 1, further comprising the step of masking said predicted image and said outline stripe with said shape approximation to form a resulting prediction signal, and storing said prediction signal in memory along with said masked error signal for use in predicting an image for the object in a subsequent frame.

23. The method of claim 1, further comprising the step of eroding the shape approximation to remove therefrom any non-object picture elements, said eroding step being performed prior to said predicting step.

24. A video object planes sequence encoder, having a reduced output bit rate, for analyzing and coding an object image having texture and position components and represented by a video signal defined by a continuous stream of successive-in-time video frames having a plurality of picture elements, said encoder comprising:

a shape approximator for approximating a shape of an object as it appears on a current frame to define an approximate shape having a boundary and a size;

a displacement estimator for estimating frame-to-frame displacements of the object based on object position in a prior frame and object position in the current frame for generating object displacement estimates;

an image predictor connected to said shape approximator and said displacement estimator for predicting an image for the object in the current frame based on an image of the object on said prior frame, said approximate shape and said object displacement estimates;

an outline generator for generating an outline stripe having a width and containing picture elements, said stripe encompassing said predicted image so that said predicted image and said stripe are sized at least equal to said approximate shape;

means for assigning texture values to the picture elements in said stripe, said values being based on picture element values in said approximate shape;

means for subtracting said outline stripe and said predicted image from the current frame to form an error signal;

a mask unit connected to said subtracting means for masking said error signal with said approximate shape to pass substantially all picture elements that are active in both said error signal and said approximate shape;

a quantizer in communication with said mask unit for quantizing the masked error signal; and an entropy coder for coding the quantized masked error signal for transmission at an output bit rate.

25. The encoder of claim 24, wherein the width of said outline stripe has a maximum value corresponding to a maximum distance between the picture elements on a boundary of the predicted image and corresponding picture elements contained on the boundary of said approximate shape.

26. The encoder of claim 25, wherein the maximum width value is below a threshold width value.

27. The encoder of claim 24, further comprising a second mask unit connected to said shape approximator and said image predictor for forming a predictor signal by masking said predicted image and stripe with said approximate shape to pass substantially all picture elements that are active in both said predicted image and stripe and said approximate shape, and a frame storage means connected to said second mask unit for storing said predictor signal for use in predicting an image of the object in a subsequent frame.

28. The encoder of claim 27, further comprising an erosion device connected between said shape approximator and said image predictor for eroding the approximate shape prior to input to said image predictor.

* * * * *